(12) United States Patent  
Grossman et al.

(10) Patent No.: US 7,286,237 B2  
(45) Date of Patent: Oct. 23, 2007

(54) FIBER OPTIC SENSOR

(75) Inventors: Barry Grossman, Melbourne, FL (US); Sachin Dekarte, Melbourne, FL (US)

(73) Assignee: Florida Institute of Technology, Melbourne, FL (US)

( * ) Notice: Subject to any disclaimer, the term of this patent is extended or adjusted under 35 U.S.C. 154(b) by 339 days.

(21) Appl. No.: 10/906,528

(22) Filed: Feb. 23, 2005

(65) Prior Publication Data

US 2005/0185189 A1    Aug. 25, 2005

Related U.S. Application Data

(60) Provisional application No. 60/547,163, filed on Feb. 24, 2004.

(51) Int. Cl.
G01B 9/02    (2006.01)

(52) U.S. Cl. ......................................... 356/480; 385/13

(58) Field of Classification Search ................ 356/519, 356/480, 477, 478; 385/13
See application file for complete search history.

(56) References Cited

U.S. PATENT DOCUMENTS

| 4,755,668 | A | * | 7/1988 | Davis ..................... 250/227.27 |
| 5,062,684 | A | * | 11/1991 | Clayton et al. ................ 385/27 |
| 5,892,582 | A | * | 4/1999 | Bao et al. ..................... 356/480 |
| 5,907,403 | A | * | 5/1999 | Andrews et al. ............. 356/480 |
| 6,056,436 | A | * | 5/2000 | Sirkis et al. ................. 374/161 |
| 6,985,235 | B2 | * | 1/2006 | Bao et al. ..................... 356/480 |
| 2005/0046862 | A1 | * | 3/2005 | Melnyk ........................ 356/480 |

* cited by examiner

Primary Examiner—Gregory J. Toatley, Jr.
Assistant Examiner—Scott M Richey
(74) Attorney, Agent, or Firm—Joel I. Rosenblatt

(57) ABSTRACT

3-Mirror fiber optic sensor for simultaneous measurement of dual parameters such as hydrogen concentration and temperature, is formed from 2 optical leads comprising 3 reflective surfaces, and defining 2 optical cavities. The effect of temperature on each of the cavities and the effect of hydrogen, for example, on the one of the cavities, produces phase shifts in the reflected lights, and interference patterns from which the parameters may be detected.

11 Claims, 3 Drawing Sheets

FIBER OPTIC SENSOR

CLAIM FOR BENEFITS OF AN EARLIER FILING DATE, UNDER 35 U.S.C. 120

Applicant claims the benefit of Provisional Application 60/547,163, filed Feb. 24, 2004.

FIELD OF INVENTION

This invention is in the field of transducers using light and fiber optics for qualitative and quantities measurements.

BACKGROUND OF THE INVENTION

Fiber optics and light have been used to measure hazardous materials like hydrogen gas, where a safe and accurate detection is essential. Because fiber optic technology employs non-reactive light guided inside a fiber, permitting remote, real-time measurement implementation, it can be used in explosive/hazardous environments such as hydrogen leak detection.

Other current, commercially available technologies used to measure hydrogen concentrations are primarily electrical in nature. Some examples are: Hydrogen Field Effect Transistors (HFETs) such as Metal Oxide Semiconductor (MOS), Metal Insulator Semiconductor (MIS) Field Effect Transistors and semiconductor sensors[20-22] such as thin film resistors. Electrical means of detection are inherently dangerous because of the fact that they use electrical current near a potentially explosive environment to detect hydrogen. Furthermore, they cease to function as intended at cryogenic temperatures.

Conventional Extrinsic Fabry-Perot fiber optic sensors based on the interference of the two or more light waves from separate multiple light sources that are reflected from the two reflective surfaces at the end of the Fabry-Perot cavity can be used to measure various measurands such as strain, force, temperature, pressure, etc. The measurand effect on the sensor changes the cavity length, producing a change in the phase of the reflected light and the interference patterns of the reflected light as an interferometer output signal. The output signal is a sinusoid generated by the two reflected beams moving in and out of phase with respect to one another. The number of sinusoidal cycles (fringes) in the output signal is proportional to the change in the length of the cavity for a given wavelength of light. Since the change in length of the cavity is related to the measurand, the number of fringes produced can be correlated to the parameter measured, such as temperature.

The conventional sensor described above requires that the temperature of the sensing point be held constant if another parameter is being measured. This requires heating or cooling of the sensing point, for example, the temperature can be maintained by means of a relatively high power laser. Such applications require separate monitoring of the temperature at the sensing point. Where two separate independent variable parameters are measured, for example temperature and hydrogen, a temperature sensor probe is used with the hydrogen sensor probe. When the two independent variables need to be measured by a single sensor, two wavelengths (i.e., an additional light source) must be employed. This is the case where temperature affects the gap length due to expansion and contraction of the materials. In addition to the added cost and complexity, the dual or multiple wavelength method is usable only over a limited range before the two variables cannot be separated (least common multiple of the wavelengths).

These disadvantages of conventional systems and methods for measurement using electricity or light are overcome by the invention described in this application, as would be understood by those skilled in the art by reading the following description of the invention.

SUMMARY OF THE INVENTION

This invention, is as shown by the disclosed inventive principles, for a preferred embodiment which does not limit or restrict the use or modification of the disclosed invention, as would be apparent to those skilled in the art.

The disclosed invention overcomes the disadvantages of conventional fiber optic or electrical measurement by a system and method of using a 3-mirror sensor that measures two or more independent variable parameters substantially at one location and substantially simultaneously, by the use of a single wavelength or light source. In a conventional two cavity arrangement, there exist 4 reflective surfaces. In the case of the disclosed invention, the two cavities have a shared common reflective transmissive surface thereby resulting in 3 reflective surfaces. An example as used to explain the invention would be hydrogen concentration and temperature. The 3-mirror sensor has the ability to extract hydrogen concentration and temperature, at substantially the same location or measurement point of interest, simultaneously with a single sensor head and by use of a single wavelength, thereby minimizing cost and complexity and increasing accuracy.

An improvement in accuracy is achieved, as would be recognized by those skilled in the art, by reducing the system and method to the measurement of a plurality of variable parameters, which are located at substantially the same point, using a single wavelength or light source and with the measurement accomplished substantially simultaneously.

The invention, as disclosed in a preferred embodiment, uses a single sensor to illuminate or energize a plurality of optical cavities, to measure a plurality of variables. As disclosed in a preferred embodiment, where temperature and hydrogen concentration is measured, two optical cavities with three reflective surfaces within a single sensor using one optical wavelength can be used.

As disclosed in a preferred embodiment, the first of the two optical cavities is made sensitive to a first parameter, as shown in a preferred embodiment, to temperature. As disclosed in a preferred embodiment, the second of two optical cavities is sensitive to hydrogen and temperature. For example, as disclosed in a preferred embodiment, Palladium (Pd) or some alloy that includes palladium may be used as a metal that is sensitive to hydrogen. Since the rate of change of volume of a cavity made with a hydrogen sensitive metal, for example Palladium, is different than the rate of change of volume with temperature, the relative phases of the light output signals from the two optical cavities, changes in response to the separate effects to the two separate variables measured. As would be understood by those skilled in the art, for a temperature sensor, the rate of change of volume with temperature would be different from the rate of change of volume for a sensor responsive to hydrogen, and the light output signal from the sensors' optical cavities will be fringes of one frequency being modulated by an envelope of a different frequency. The signals produced having different frequencies, separately indicative of temperature and hydrogen, for example, can be separated and the separate effects or presence, of temperature and hydrogen on the sensor can be separately detected.

As shown, a plurality of independent variables substantially at one location can be measured substantially simultaneously, with one sensor and one wavelength.

As would be understood by those skilled in the art, from reading the Detailed Description, following, the disclosed method and system can be used in applications that require the monitoring of other independent variables. For example: pressure-temperature, strain-temperature, chemical and biological sensing, to name a few examples.

One example of an application of the disclosed inventive principles, without limiting the applications of the disclosed inventive principles, is in the fuel cell energy systems. At this time, it is estimated fuel cell technology soon will be 34% of the energy market and will play an important role in the energy economy in stationary fuel cells for power generation and mobile fuel cells in the transportation sector. A cost effective and accurate sensor, for measuring hydrogen, as disclosed herein according to the inventive principles for a preferred embodiment, using a single interferometer sensor, will be needed to detect hydrogen leaks and monitor hydrogen usage.

DETAILED DESCRIPTION

Figure 1:
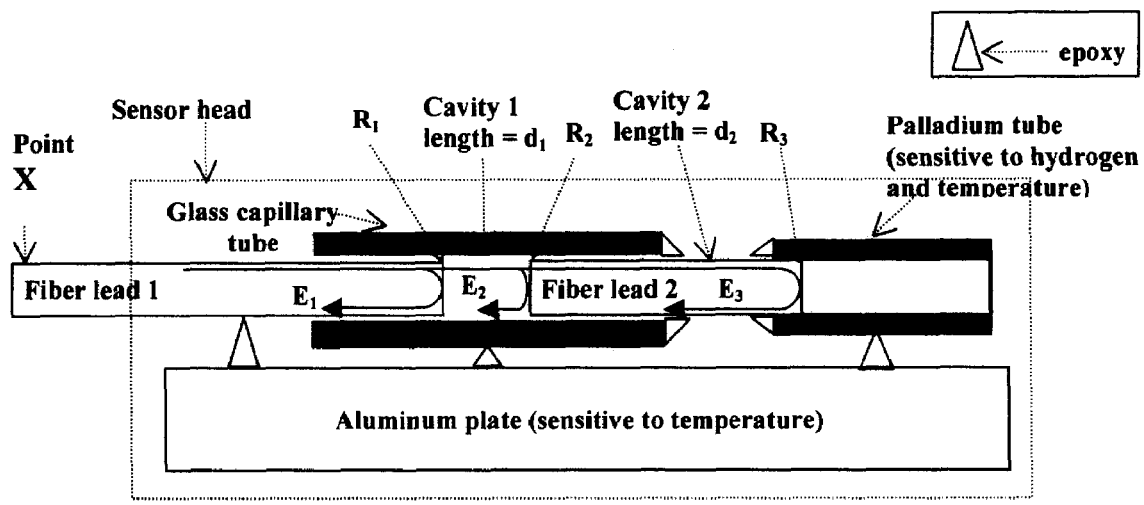
FIG. 1 shown in schematic form, a preferred embodiment of the fiber optic sensor in cross section.

The invention is described with reference to the disclosed inventive principles, as shown for a preferred embodiment, in the cross section view of FIG. 1. The sensor is disclosed as comprising two optical cavities, Cavity 1 with an optical length d1 and Cavity 2, with an optical length d2. As would be understood by those skilled in the art, the respective optical lengths d1 and d2 are formed between the partially reflective, partially transmissive ends of Fiber Lead 1 and Fiber Lead 2. Reflective Surfaces R1, R2, are partially transmissive and partially reflective surfaces reflecting light from a laser light source directed to the sensor from Point X. The laser light source, as described for a preferred embodiment is not shown as its application would be understood by those skilled in the art.

As would be understood by those skilled in the art, the disclosed invention is not limited to a laser light of electromagnetic radiation, but may use any optical source with sufficient coherence consistent with the disclosed inventive principles.

As shown in a preferred embodiment, Reflective Surface R1, produces a reflection of the light from a single source and at a single wavelength, entering Fiber Lead 1, from Point X, as shown by path E1, and transmits light through Cavity 1, to Fiber Lead 2, where it is reflected at Reflective Surface R2, as shown by path E2. Similarly, the light from Point X, transmitted to Fiber Lead 1, is transmitted through Cavity 1 and Fiber Lead 2 to Cavity 2, formed within Fiber Lead 2, and to Reflective Surface R3, where it is reflected as shown by path E3. As seen in FIG. 1, for a preferred embodiment, Cavity 1 is between Reflecting Surface R1 of Fiber Lead 1 and R2 of Fiber Lead 2 and Cavity 2, is between Reflecting Surfaces R2 of Fiber Lead 2 and R3 of Fiber Lead 2.

Fiber Leads 1 and 2, forming Cavity 1 is made sensitive to temperature as described in the following. Cavity 1, is fixed by epoxy, for example, to a temperature sensitive medium, as shown in a preferred embodiment to an aluminum plate, and made from a material substantially neutral to the temperature variable parameters in measurement, for example, a glass tube. The glass tube may be replaced by any other suitable material, where a different measurand is of interest or where the sensitivity of the glass tube to the temperature in measurement may be factored into the final temperature measurement. By measurand is meant the variable parameter of interest and measured.

Cavity 2, for the hydrogen related measurement, as shown and disclosed in a preferred embodiment, is formed within Fiber Lead 2, with Reflective Surface R3, held or mounted within the Palladium tube. For a preferred embodiment, Palladium is used for its sensitivity to hydrogen. However, as would be known and understood by those skilled in the art, other suitable materials may be used as may be sensitive and suitable or measuring other independent variables and this disclosed inventive principles are not limited to the measurement of hydrogen or temperature.

For a preferred embodiment, Cavity 1 and Cavity 2, are mounted on a common aluminum plate, and are sensitive to temperature. Cavity 2, mounted in the hydrogen sensitive Palladium tube, is made sensitive to hydrogen. As would be known to those skilled in the art, palladium changes in its dimension when exposed to hydrogen. An induced change in the dimension of the Palladium tube will cause a change in the length of Fiber Lead 2, without any substantial effect on Fiber Lead 1, separated from the Palladium tube by Cavity 1, within the substantially temperature neutral glass tube. The change in the length of Fiber Lead 2 produces a change in Cavity length d2, and a change in relative phase of the signal reflected in path E3, relative to the light reflected in path E2, within intrinsic Cavity 2 and the interference pattern established in extrinsic Cavity 1 by the relative phase of the light reflected in paths E1 and E2.

As would be understood by those skilled in the art, sΔystem disclosed in FIG. 1, according to the disclosed inventive principles as shown for a preferred embodiment, is a three mirror interferometer, using a single light wavelength or light from a single source and measuring a plurality of independent variables substantially at one spatial location.

For example, for a material with initial length $L_0$ and coefficient of linear expansion $\alpha_A$, that undergoes a temperature change of $\Delta T = T_1 - T_2$, the change in length ($\Delta L$) is given by the formula $$\Delta L = L_o * \alpha_A * \Delta T \qquad \text{Eq. 3.1}$$

For two different materials of length $L_1$ and $L_2$ with coefficient of linear expansion $\alpha_1$, and $\alpha_2$ ($\alpha_1 > \alpha_2$) and arranged as the dual cavity interferometer, the change in length of the material attached to these materials is, $$\Delta L = [(L_1 * \alpha_1) - (L_2 * \alpha_2)] * \Delta T \qquad \text{Eq. 3.2}$$

The change in relative length, of the Fiber Leads 1 and 2 therefore, produces a change in light path E1, E2, and E3 and the light reflected at Reflective surfaces R2 and R3, in respective light paths E2 and E3, will be seen to have different phase relationships with respect to one another and E1. This allows the three waves to interfere and the resulting interference output signal or interferometer output signal, is proportional to the resultant optical power at the detector, $P_0$.

$$P_o \alpha (E_1+E_2+E_3)^2 \qquad \text{Eq. 3.3}$$

$$\text{Where; } E_1 \sim E_0 \cos[f(\theta_o)] \qquad \text{Eq. 3.4}$$

$$E_2 \sim E_0 \cos[(g(\theta_o \Delta T)] \qquad \text{Eq. 3.4}$$

$$E_3 \sim E_0 \cos[(h(\theta_o \Delta T, \Delta H_2)] \qquad \text{Eq. 3.4}$$

Figure 2:
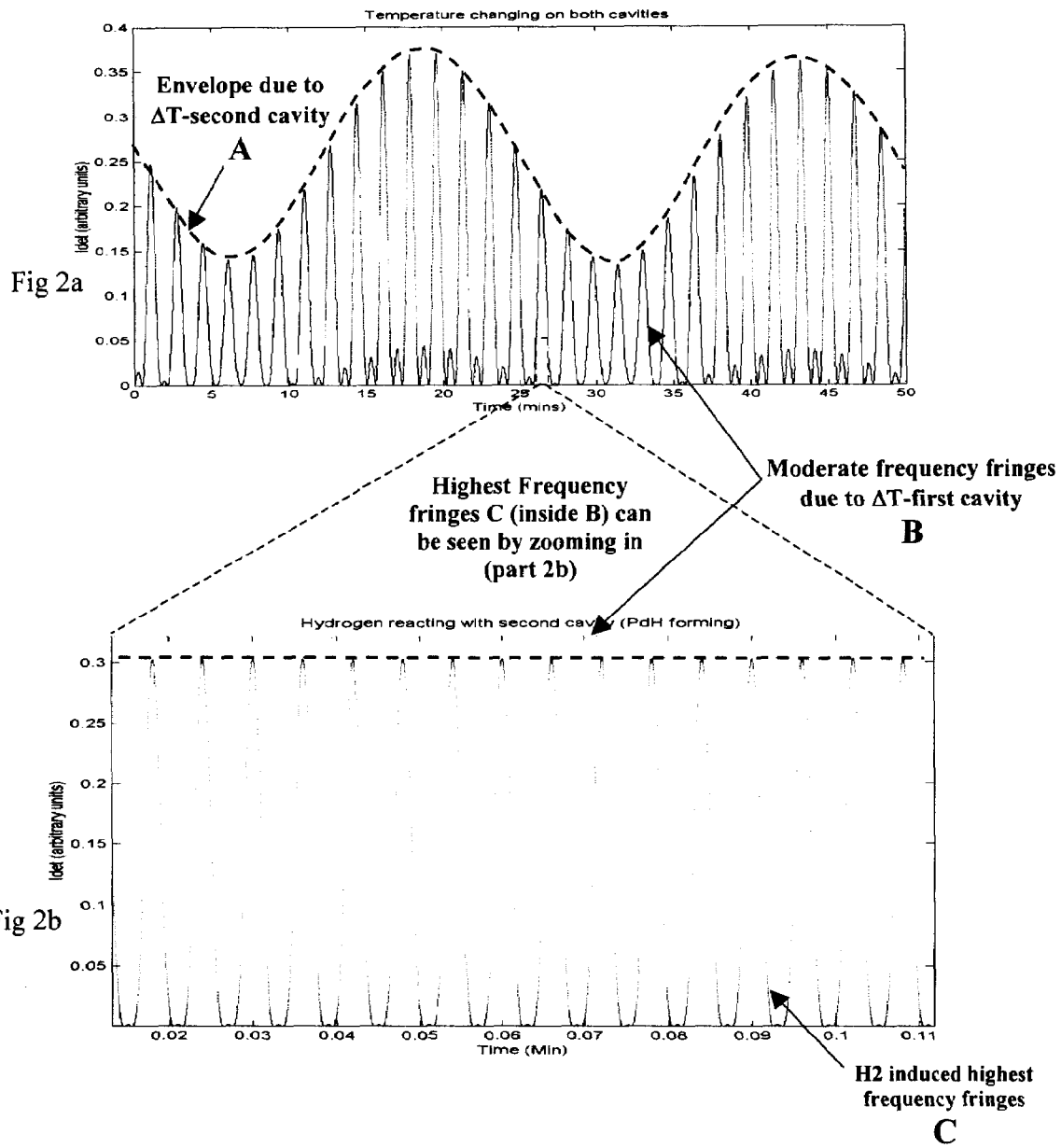
FIGS. 2a and 2b, shown in juxtaposition, the fringe rates of the reflected light output of the fiber optic sensor of FIG. 1, for a fringe rate A responsive to temperature at Cavity 2, a fringe rate B responsive to temperature at Cavity 1, and a fringe rate C responsive to the presence of hydrogen at Cavity 2.

And $E_0$ is a constant
$E_1$ is the Electric field reflected back from $R_1$
$E_2$ is the Electric field reflected back from $R_2$
$E_3$ is the Electric field reflected back from $R_3$
$f\theta_o$ is the initial phase
$g(\theta_o \Delta T)$ is function of the initial phase and change in temperature
$(h(\theta_o \Delta T, \Delta H_2)$ is a function of the initial phase, change in temperature and hydrogen For a preferred embodiment, FIG. 2a shows two fringe rates that are caused by temperature alone. These are denoted as the slowly changing envelope A (units of fringes per hour) for changes in temperature at the second Cavity C2 and the more rapidly changing B (units of fringes per minutes), at the first cavity C1.

In a preferred embodiment, hydrogen only affects the second cavity, Cavity C2, shown as a palladium tube, and does not affect the temperature sensitive cavity C1. The effect of hydrogen would be to increase the length of the palladium tube and cause the length of the second cavity, Cavity 2, to decrease by this amount. This causes the phase relationship of E3 to change with respect to E1 and E2 thereby causing the three fields of reflected light from Reflective Surfaces R1, R2, and R3, to interfere, in response to the change in the two independent variables, shown in a preferred embodiment, as temperature and hydrogen. In a preferred embodiment, the system response due to the effect of hydrogen on the fiber optic sensor is shown in FIG. 2b. The fringe rate due to hydrogen is denoted as C and has units of fringes per second. From FIG. 2b, it can be seen that the fringe rate due to hydrogen C, is significantly larger than temperature related fringe rates.

Since the fringe rate shown as A due to temperature at Cavity 2, and B due to temperature at Cavity 1, and the fringe rate C at Cavity 2, due to hydrogen, are different sufficiently to be separately detectable, the temperature effect can be separated from the hydrogen effect by frequency based signal processing, as would be known to those skilled in the art and as explained below.

Figure 3:
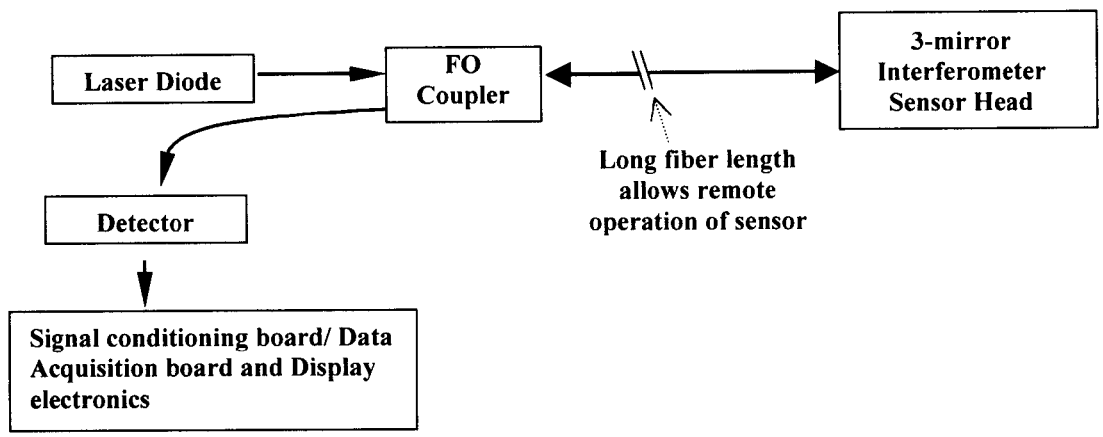
FIG. 3, shows for a preferred embodiment, a system for detecting the reflected light output of the fiber optic sensor as shown in FIG. 1 and the fringe rates as shown in FIG. 2a and 2b.

As shown for a preferred embodiment in FIG. 3, a fiber optic coupler, shown for example in FIG. 3, as FO Coupler is arranged to receive the interferometer output signal produced by the phase relation of the reflected in light paths E1, E2, and E3, from Reflecting Surfaces R1, R2, R3, and transmit it to an optical to electronic signal detector, as would be known to those skilled in the art.

As shown in preferred embodiment, the fringe rate optical signals due to the presence of hydrogen and the effect of temperature are different, fringe rate A indicative of the fringe rate at the second cavity Cavity, 2, due to temperature being slow in relation to the fringe rate B due to temperature at the first cavity C1 and the higher fringe rate C due to hydrogen, at the second cavity C2.

Figure 4:
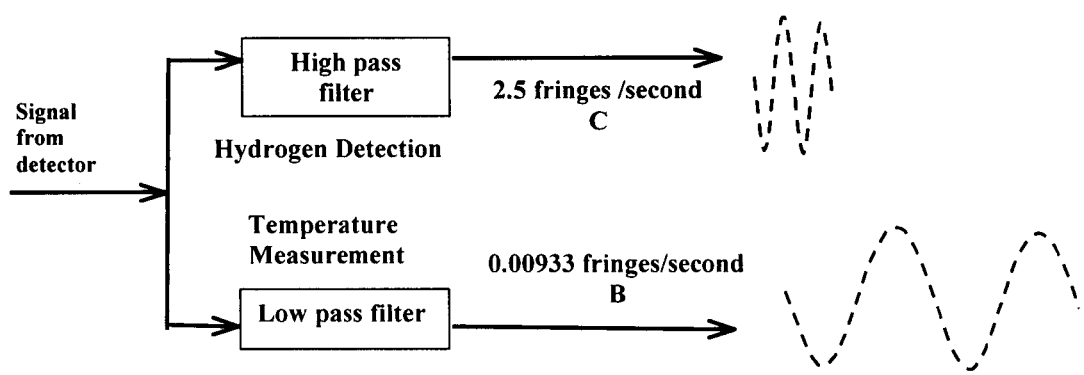
FIG. 4, shows for a preferred embodiment, a part of the system of FIG. 3, for filtering the fringe rates.

As shown in the block diagram of FIG. 4, the electrical signal from the detector, as shown in FIG. 3, may be processed to filter or separate the signals indicative of fringe rate B and the temperature and fringe rate C and of hydrogen.

As would be known to those skilled in the art, signal processing using software techniques involves operating on the interferomertic output signal using fourier transform methods may be uses to separately identify the high and low frequency components that result from such an operation are identified in FIG. 4, as B and C.

As may be seen and understood from the disclosed inventive principles, signal processing will filter out the low frequency component of the optical output from the interferometer output signal, thereby eliminating the temperature effect from the hydrogen responsive signal. The low pass filter will filter out the high frequency component of the output from the interferometer sensor, leaving the temperature signal. Thus by processing the signal for the fringe rates, the temperature effect can be separated from the hydrogen effect, thereby allowing the independent monitoring of two variables by one sensor head.

As would be known by those skilled in the art, the disclosed invention is not limited to a preferred embodiment as described but may be practiced with any suitable means as is not known or known hereafter.

What is claimed is:

1. A two cavity, three mirror, optical sensor, for sensing temperature or hydrogen, comprising:
   a. a first fiber lead with a first reflective end surface and a second fiber lead with a second reflective end surface and with a third reflective end surface;
   b. a temperature sensitive plate, with a coefficient of expansion responsive to temperature;
   c. said first fiber lead connected to said plate at a location on said first fiber lead displaced from said first reflective end surface;
   d. a first tube and a second tube substantially in axial alignment;
   e. said first and second fiber leads and said first tube, made from a material substantially neutral to temperature, relative to said coefficient of expansion of said temperature sensitive plate;
   f. said first tube enclosing said first reflective end surface and a part of said first fiber lead and said second reflective end surface and a part of said second fiber lead, displaced from said first fiber lead and forming a first optical cavity of a first optical length, between said first and second reflective end surfaces;
   g. said first tube connected to said temperature sensitive plate and connected to said second fiber lead;
   h. said second tube made from a material with a coefficient of expansion responsive to hydrogen;
   i. said second tube connected to said temperature sensitive plate and to said second fiber lead;
   j. said second tube enclosing part of said second fiber lead and said third reflective end surface and forming a second optical cavity of a second optical length between said second and third reflective end surfaces;
   k. said first tube and said second tube and said first fiber lead and said second fiber lead and said first reflective end surface, said second reflective end surface, and said third reflective end surface, displaced in axial alignment for transmission of light to said first, second, and third, reflective end surfaces, and for transmission of light reflected from said first, second, and third, reflective end surfaces with separate phase displacements related to said axial displacement of said first, second, and third, reflective end surfaces.

2. The optical sensor of claim 1, wherein said phase displacement of said light reflected from said second reflective end surface relative to said light reflected from said first reflected end surface, is indicative of the effect of temperature on said temperature sensitive plate.

3. The optical sensor of claim 1, wherein said phase displacements of said light reflected from said third reflective end surface relative to said light reflected from said second reflected end surface, is indicative of effect of hydrogen on said second tube and indicative of temperature on said second fiber lead.

4. The optical sensor of claim 1, wherein said phase displacements of said light reflected in a second path from said second reflective end surface relative to said light reflected in a first path from said first reflected end surface, is indicative of the effect of temperature on said temperature sensitive plate; and wherein said phase displacement of said light reflected in a third path from said third reflective end surface relative to said light reflected in said second path from said second reflected end surface, is indicative of effect of hydrogen on said second tube and indicative of temperature on said second fiber lead.

5. The optical sensor of claim 4, wherein, changes in said phase displacement of said light reflected in respective said first, second, and third, reflective paths, are arranged to interfere in response to the effect of changes in temperature on said temperature sensitive plate and said first optical cavity, and in response to the effect of changes in hydrogen on said second optical cavity.

6. The optical sensor of claim 5, wherein, said second tube coefficient of expansion is arranged to expand said second tube in response to hydrogen, at a rate substantially greater than said temperature sensitive plate is arranged to expand in response to change in temperature and wherein, said respective first, second, and third, reflective light paths, are arranged to interfere, in a first interference fringe rate responsive to said effect of hydrogen on said second optical cavity, in a second interference fringe rate responsive to said effect of temperature on said first optical cavity, and in a third interference fringe rate responsive to the said effect of temperature on said second optical cavity, wherein said first interference fringe rate is higher than said second and third interference fringe rates and said third interference fringe rate is substantially lower than said second interference fringe rate.

7. The optical sensor of claim 1, wherein said temperature sensitive plate is aluminum and said hydrogen sensitive tube is palladium.

8. The optical sensor of claim 4, wherein said temperature sensitive plate is aluminum and said hydrogen sensitive tube is palladium.

9. The optical sensor of claim 4, wherein said effect of increasing temperature on said temperature sensitive plate is to decrease said first optical cavity first optical length.

10. The optical sensor of claim 4, wherein said effect of increasing hydrogen on said second tube is to decrease said second optical cavity second optical length.

11. The optical sensor of claim 4, wherein said effect of increasing temperature on said temperature sensitive plate is to decrease said first optical cavity first optical length; and wherein, said effect of increasing hydrogen on said second tube is to decrease said second optical cavity second optical length.

* * * * *

UNITED STATES PATENT AND TRADEMARK OFFICE
CERTIFICATE OF CORRECTION

PATENT NO. : 7,286,237 B2 Page 1 of 1
APPLICATION NO. : 10/906528
DATED : October 23, 2007
INVENTOR(S) : Barry Grossman and Sachin N. Dekate It is certified that error appears in the above-identified patent and that said Letters Patent is hereby corrected as shown below:

On the Title Page (75)
The name of the second inventor is corrected to,

SACHIN N. DEKATE

Signed and Sealed this

Twenty Second Day of April, 2008

JON W. DUDAS
*Director of the United States Patent and Trademark Office*